Dec. 25, 1928.
F. E. RAYMOND
VALVE
Original Filed July 21, 1923
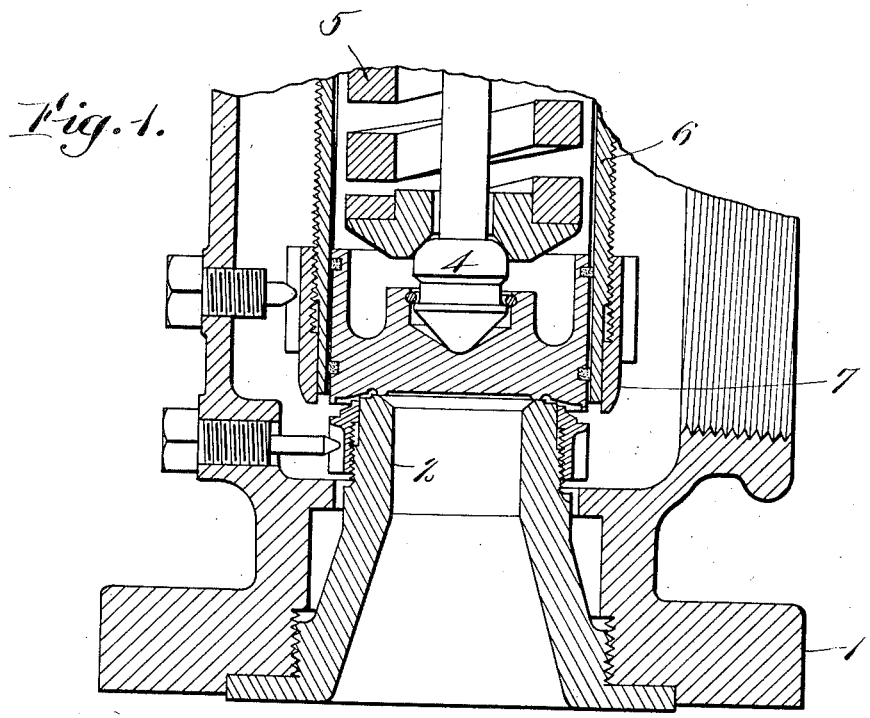
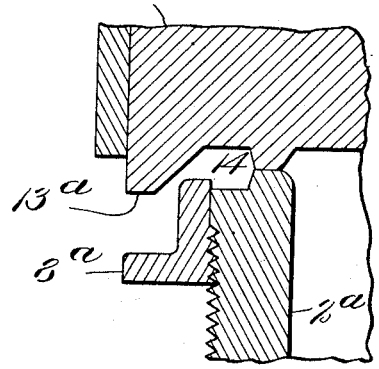
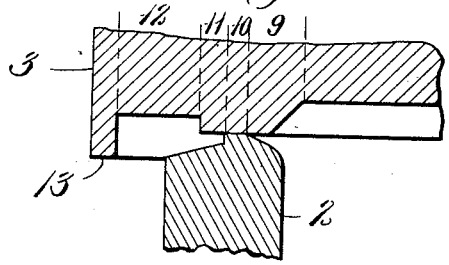
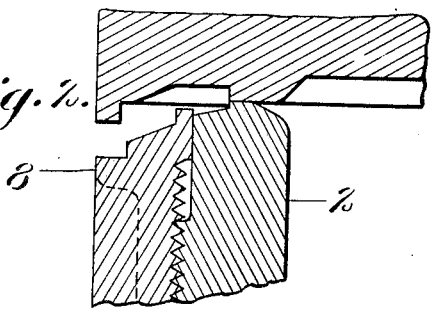
Inventor:
Fairfield E. Raymond
by Ralph W. Foster att'y.

Patented Dec. 25, 1928.

1,696,452

UNITED STATES PATENT OFFICE.

FAIRFIELD E. RAYMOND, OF BOSTON, MASSACHUSETTS, ASSIGNOR TO CROSBY STEAM GAGE AND VALVE CO., OF BOSTON, MASSACHUSETTS, A CORPORATION OF MASSACHUSETTS.

VALVE.

Application filed July 21, 1923, Serial No. 652,931. Renewed June 15, 1928.

This invention relates to safety valves and its object is to improve their operation, which object is accomplished by employing alone, or in conjunction with adjustable rings, guides, sleeves and shrouds, a series of nozzles and deflectors so designed and relatively disposed as to secure a discharge passage having a series of cross-sectional areas, none of which cross-sectional areas shall be less than that at the throat or seat of the valve, for any required lift, thus providing against any restriction in the flow of the escaping fluid.

By this means we secure a valve, in which the lifting action is separated from the blow down action and which as a result has a lift greater than that attained in valves having a huddling chamber and which still closes with the least drop in pressure.

The invention is illustrated by the accompanying drawings in which:—

Figure 1 is a central, vertical section of a portion of a safety valve embodying the improved features; Fig. 2 is an enlarged detail view of a portion (disc and seat) of Fig. 1; Fig. 3 is a detail view similar to Fig. 2 but without the blow down ring; and Fig. 4 is a detail view similar to Fig. 3 of a modification.

The principal members or elements of the valve 1 shown in the drawings are:—the seat or throat tube 2; the disc 3 seated on the throat tube; the spindle 4; the spring 5; the sleeve 6 adjustably fixed to the valve casing; the deflector 7 adjustably fixed to the sleeve 6; and the blow down ring 8 adjustably fixed to the throat tube.

The seat or throat tube 2 and disc 3 are so designed, proportioned and relatively disposed as to provide successively the converging nozzle 9, the short tube nozzle (orifice) 10; the diverging nozzle 11, the expanding nozzle 12, and the deflecting disc lip 13.

The disc and seat are so designed and related that, when separated, they form a series of converging, diverging and expanding nozzles, and this is accomplished by giving to one, or both, irregular surfaces with suitable angles, so that the jet of fluid is directed against a deflecting lip 13, or its equivalent, integral or movable with the disc.

The adjustable blow down ring 8 is designed to so alter the cross sectional areas of nozzles 11 and 12 as to secure the required expansion ratios.

The operation is as follows:—

The valve is set to blow at a certain pressure and when that pressure is reached the disc begins to rise; the fluid passes through the converging nozzle 9 and the short tube nozzle (orifice) 10, wherein sufficient pressure is created to raise the disc; whereupon a jet of fluid enters diverging nozzle 11, in which additional pressure is exerted on additional areas, thereby increasing the lift; the resulting jet enters expanding nozzle 12, in which sufficient velocity is attained to develop, in conjunction with the mass of fluid flowing, the reactive force required to raise the disc the desired amount, when the jet is deflected downward by the lip 13.

The degree of expansion and accordingly the degree of reactive force developed is maintained by the fixed proportions of the ratios of expansion of nozzles 11 and 12; which re-active force may be varied and controlled by the adjustable blow down ring 8 so placed in relation to the throat tube or seat that the expansion ratio of nozzles 11 and 12 may be altered at will.

The operation in closing is the reverse of that described, the final blow of the disc on the seat being cushioned by the pressures developed within nozzles 9, 10 and 11, as their effective areas become gradually and relatively less.

To properly distribute the static and dynamic forces, the relative dimensions of the parts above described may be changed, or the adjustable blow down ring 8 may be so disposed, relative to the disc and seat, as to vary the areas of the passages between them.

The area of passage beyond the seat section is always greater than that at the seat section and, as the disc takes full lift, all areas beyond the controlling throat area in either direction gradually increase, so that under all conditions there is but one limiting orifice which is the maximum for any given lift.

The converging nozzle 9 at the throat maintains the required maximum velocity of flow by keeping the velocity of escaping fluid at the minimum while in contact with the rough pipe surfaces and developing the maximum only in the throat, thereby reducing the friction to a minimum.

By means of deflector ring 7 and its position relative to the various elements above described, the valve may be made to operate in one or more pops with a long or short accumulation, or to accomplish its full lift all in one. The seating of the valve may also be regulated to close directly or in one or two steps as desired.

The invention is applicable to a safety valve or relief valve or any valve depending for its operation upon the conditions of flow of the liquid, or fluid, or gas through it, and in which there are the essential parts, such as a seat, or throat tube, and disc disposed within a casing having one or more parts and operating directly or indirectly in conjunction with a spring, suitably supported within or without said casing, or an equivalent opposing force, and with or without adjustable rings, guides, sleeves, and shrouds.

A converging nozzle is necessary at the entrance in order to regulate and maintain the required condition of flow and to reduce friction by keeping the maximum velocity of the fluid at the throat away from the rough pipe surfaces and to develop such maximum velocity in the shortest distance possible. In this way only can the full flow of the fluid in a pipe be maintained at maximum efficiency.

A huddling chamber may be substituted for nozzles 9, 10, 11, provided it is so disposed as to direct the issuing jet of fluid against the deflecting lip of the disc, as illustrated in Fig. 4, where the huddling chamber 14 is formed by the disc 3$^a$ with its deflecting lip 13$^a$, the seat or throat tube 2$^a$, and the blow down ring 8$^a$.

The above described construction accomplishes two functions both highly desirable in a safety or pop valve. In the first place, the provision of the adjustable deflector sleeve 7 enables a very marked increase in lift of the disc to be obtained as contrasted with the usual form of valve due to the reactive force exerted upon the disc as it is elevated or separated from the cooperating seat. Inasmuch as the projection of the deflector sleeve below the disc increases with increased elevation of the disc, a progressively increasing reactive lift is exerted, due to increasing deflection of the fluid which imparts relatively large openings to the valve with comparatively small excess pressure. On the other hand, the provision of the adjustable blow-down ring permits closing of the valve within relatively small blow-down limits and enables any given type of valve to be adjusted accurately for given blow-down limits. By proper adjustment of both sleeves, the combined maximum opening and low blow-down, both of which are desirable in this type of valve, may be obtained irrespectively of variations in the loading spring and the character of the seat.

I claim:—

1. In a valve of the character described, a throat tube terminating in a seat, a movable valve disc cooperating with the seat and providing a nozzle in conjunction with the seat, a blow-down ring adjustably connected to the throat tube, a deflector sleeve cooperating with the disc to cause a progressively increasing reactive force to be exerted on the face of the disc during the separation of the disc from the seat, and means for supporting the deflector sleeve having provision for adjustment while retaining the sleeve normally stationary during the opening movements of the disc.

2. In a valve of the character described, a valve body having an opening extending thereinto, a separable throat tube detachably connected to the body externally of the tube, the throat tube terminating at its upper end in a valve seat and forming a continuous and integral exhaust passage between the valve seat and the structure to which the valve body is connected, a movable valve disk coacting with the seat, a guide sleeve for guiding the disk wholly from above the seat, and a deflector shroud ring adjustably mounted on the guide sleeve and cooperating with the valve disk to exert a reactive force upon the face of the disk during its separation from the seat.

FAIRFIELD E. RAYMOND.